(12) United States Patent
Barnes et al.

(10) Patent No.: US 7,485,360 B2
(45) Date of Patent: Feb. 3, 2009

(54) HIGH STRENGTH FILM/BOARD LAMINATION AND METHOD OF MAKING SAME

(75) Inventors: Christopher C. E. Barnes, Houston, TX (US); Michael J. Rancich, Houston, TX (US)

(73) Assignee: Illinois Tool Works Inc., Glenview, IL (US)

( * ) Notice: Subject to any disclaimer, the term of this patent is extended or adjusted under 35 U.S.C. 154(b) by 661 days.

(21) Appl. No.: 11/108,211

(22) Filed: Apr. 18, 2005

(65) Prior Publication Data

US 2006/0234011 A1 Oct. 19, 2006

(51) Int. Cl.
*B32B 7/14* (2006.01)
*B32B 29/06* (2006.01)
*B32B 37/00* (2006.01)
*B32B 3/28* (2006.01)

(52) U.S. Cl. .................. 428/182; 428/105; 156/290; 156/291

(58) Field of Classification Search ................ 428/105, 428/182; 156/290–292
See application file for complete search history.

(56) References Cited

U.S. PATENT DOCUMENTS 4,132,581 A * 1/1979 Swartz ................. 156/208
5,062,527 A 11/1991 Westerman et al.
5,615,795 A 4/1997 Tipps et al.
6,284,344 B1 9/2001 Barnes et al.
2004/0170810 A1 9/2004 Ramussen

FOREIGN PATENT DOCUMENTS

WO WO2004/054793 7/2004
WO WO2006/061168 6/2006

OTHER PUBLICATIONS

Wo-02/102592, Dec. 2002.*
PCT International Search Report dated Jul. 19, 2006.

* cited by examiner

*Primary Examiner*—Donald Loney
(74) *Attorney, Agent, or Firm*—Mark W. Croll; Donald J. Breh; Levenfeld Pearlstein, LLC

(57) ABSTRACT

A high strength film/board lamination is formed from a cross-oriented laminated film and a corrugated layer. The cross-laminated film is formed from a first oriented plastic layer and a second oriented plastic layer in which the orientations of the plastic layers cross at an angle between but not equal to zero degrees and 180 degrees relative to one another. The cross-oriented laminated film is adhered to the corrugated layer in a noncontinuous manner. A method of forming a high strength lamination and a method of improving tear resistance in corrugated paper or paperboard based materials are also disclosed.

17 Claims, 1 Drawing Sheet

HIGH STRENGTH FILM/BOARD LAMINATION AND METHOD OF MAKING SAME

BACKGROUND OF THE INVENTION

The present invention relates to a film/board laminated construction. More particularly, the present invention relates to a high strength film/board lamination for packaging and the like.

Packaging materials are used in every manner of everyday life. Corrugated packaging materials were used as early as the 1870s to protect fragile and valuable objects during packing and handling. Many of the paper, paperboard and fiberboard materials used in the manufacture of early corrugated materials are still in use today in their basic form and/or with slight improvements.

Although corrugated materials function well, in order to improve the tear strength of the material, heavier gauge materials are used for the liner sheet (the inner and outer material sheets that sandwich the corrugated sheet). This heavier material adds both weight and cost, which can be unpredictable, particularly when the cost for the raw materials vary based upon market conditions.

Oftentimes, it is desired to increase the localized or tear and burst strength and impact resistance of a package as opposed to the overall load bearing or load carrying strength. For example, when a package is used for packaging a light-weight object having a point or edge, it would be desirable to use a material that precludes the object from poking through the package. Using known materials, a heavy weight (thicker) liner sheet would be used to achieve the desired strength, even though the weight of the object would not warrant use of such a material.

Accordingly, there is a need for a packaging material that provides the rigidity and structural strength of corrugated packaging materials with an increased localized or burst strength. Desirably, such a material provides the increased burst strength with little to no increase in the thickness or gauge of the corrugated material liner sheets.

SUMMARY OF THE INVENTION

A high strength film/board lamination is formed from a cross-oriented laminated film and a corrugated layer. The film is formed from first and second oriented plastic layers in which the plastic layer orientation cross at an angle between but not equal to zero degrees and 180 degrees relative to one another. The corrugated layer and film are adhered to one another layer in a noncontinuous manner, so as to create distinct regions of different bonding strength (e.g., high-low (moderate) strength regions, bonded-nonbonded regions).

The film/board lamination provides the rigidity and structural strength of corrugated packaging materials with an increased localized or burst strength (by virtue of the cross-oriented laminated film). The material provides an increased burst strength without significantly increasing the thickness or gauge of the corrugated material liner sheets.

Preferably, the first and second plastic layers are oriented relative to one another at an angle of about ninety degrees. Exemplary plastic layer are formed from polyolefin materials, preferably, polyethylene.

To effect a higher increase in burst strength, the cross-laminated film is spot adhered to the corrugated layer. Alternately, an adhesive can be disposed at predetermined locations between the cross-laminated film and the corrugated layer to form non-bonded regions of the film and corrugated layer. Alternately, regions of different bonding strengths (e.g., high-low (moderate) strength regions can be used.

In one embodiment, the first and second plastic layers are oriented in first and second non-parallel directions (at an angle between and excluding zero degrees and 180 degrees) and the corrugated layer includes flutes that extend in a direction that is not parallel to (between and excluding zero degrees and 180 degrees) either the first or second directions.

A method of forming a high strength lamination and a method of improving tear resistance in corrugated paper or paperboard based materials are also disclosed.

These and other features and advantages of the present invention will be readily apparent from the following detailed description, in conjunction with the claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
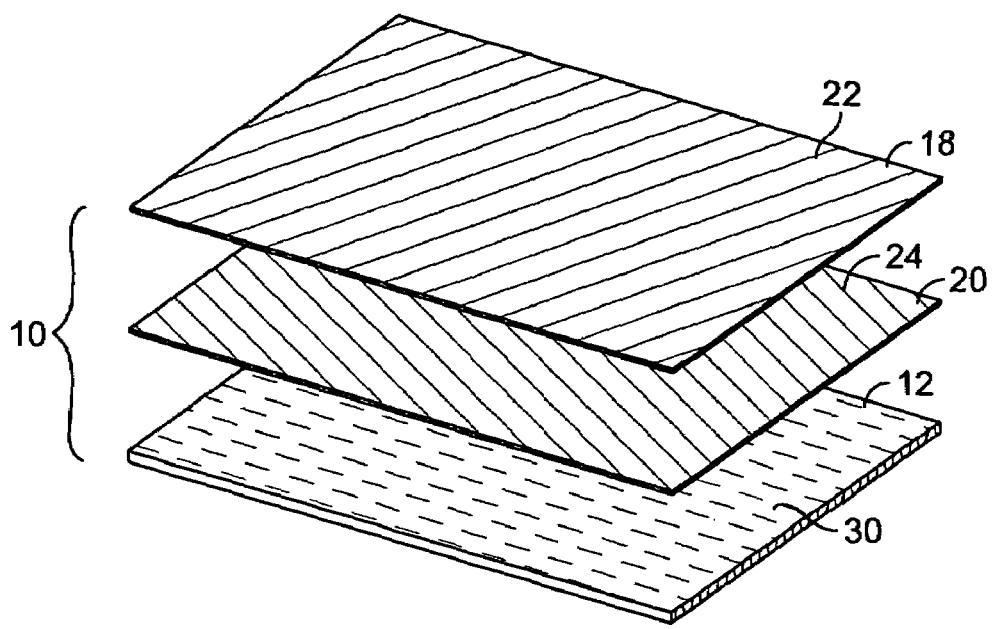
FIG. 1 is a schematic, exploded view of a high strength film/board lamination in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
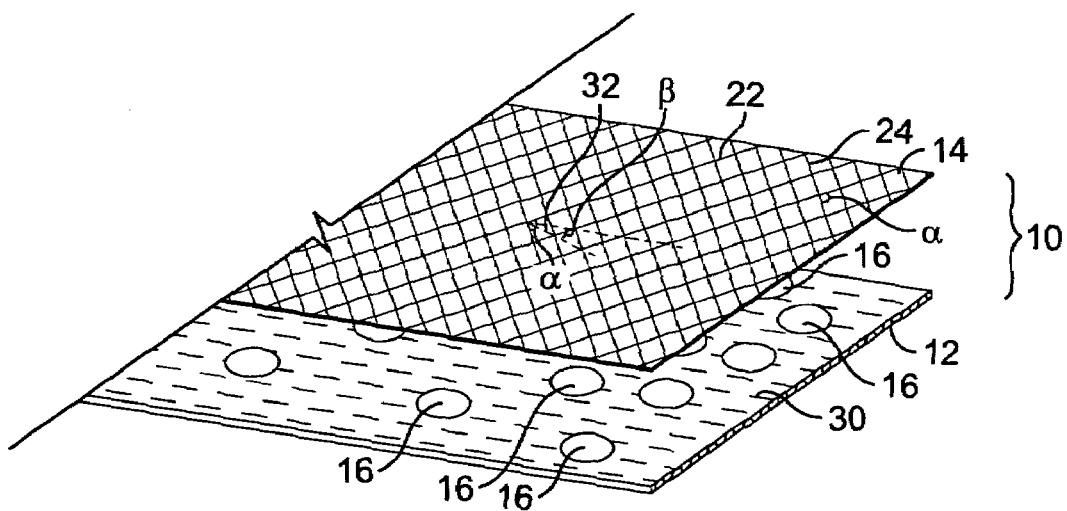
FIG. 2 is a further exploded view of the lamination.
Figure 3:
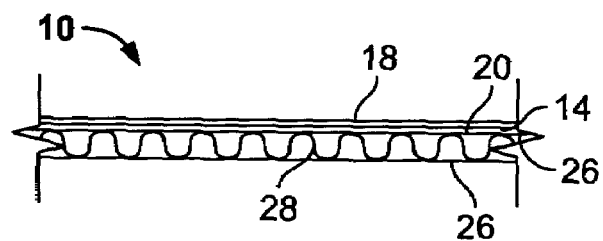
FIG. 3 is a cross-sectional view of the lamination.

Referring now to the figures and in particular to FIG. 1, there is shown a schematic, exploded perspective of a high strength film/board lamination 10 in accordance with the principles of the present invention. The lamination 10 (or laminate) is formed from a base or substrate corrugated layer 12 and a film layer 14 (see FIG. 2) that are adhered to one another in a non-continuous manner. In the illustrated embodiment, the corrugated 12 and film 14 layers are adhered to one another at discrete, spot-bonded locations 16 on their coextensive faces. As is discussed below, the non-continuous nature of the adhering process reduces the tendency for a tear or puncture in one of the layers (e.g., a tear in the corrugated layer 12) to influence a tear in the other layer (e.g., the film layer 14), as the film layer can stretch to absorb impact or burst energy.

In a present laminate 10, the film 14 is formed from first and second oriented plastic layers 18, 20. The direction of orientation 22 of the first plastic layer 18 crosses the direction of orientation 24 of the second plastic layer 20 at a predetermined angle $\alpha$ such that the orientations 22, 24 of the layers 18, 20 are non-parallel. That is, the plastic layer orientations 22, 24 cross one another at an angle $\alpha$ between but not equal to zero degrees and 180 degrees. As seen in FIG. 1, the orientation of layer 18 is indicated by the lines at 22 and the orientation of layer 20 is indicated by the lines at 24. A preferred angle $\alpha$ is about 90 degrees. An exemplary film is a cross-laminated film, VALERON® strength film, commercially available from Valeron Strength Films, a division of ITW, of Houston, Tex.

A preferred material for the film 18, 20 layers is high density polyethylene (HDPE). Other suitable materials include polypropylene or a variety of other polyolefin materials and blends, so long as the material is capable of being oriented. A discussion of forming multi-layer, oriented or "bias-cut" plastic films is described in Barnes et al., U.S. Pat. No. 6,284,344, the disclosure of which is incorporated herein by reference.

Those skilled in the art will recognize that the orientation of a plastic layer is a characteristic that is imparted to the film during manufacture. Typically, a polymer is melted and extruded into a bubble form from an extruder die. The film is then cooled, for example, using an annular air-ring (blown film process). The cooled bubble is collapsed to form layflat tubing which is then stretched. It is the extrusion and stretching operations that "orient" the film. Essentially, the long chain polymer molecules are oriented or directed as a result of the extrusion and stretching processes. The oriented layflat tubing so produced is then bias cut to produce a single layer of film where the orientation angle is at the desired angle to the machine direction.

As set forth above, the film layer 14 (which itself is a laminate of layers 18, 20), is adhered to the corrugated layer 12 in a non-continuous or a discontinuous manner. In a present material, the corrugated 12 and film 14 layers are adhered to one another by spot bonding 16 the materials using adhesives, hot melts, polymer (e.g., extrusion lamination) and the like. Alternately, the materials 12, 14 can be bonded by patterned transfer rolls in an adhesive lamination arrangement, patterned chill or rubber nip rolls in extrusion lamination, or printing an adhesive or "release" material to effect the low bond area.

Six material samples, including the present high strength film/board laminate material 10, were subjected to impact resistance testing (per ASTM D781 (modified)) to determine the increased strength of the lamination. A first material was a cross-laminated film of 3.0 mil VALERON® brand film (VA030030); a second material was a 200 lb. "C" flute corrugated board material; a third material was a combination of the VALERON® brand film and the corrugated material board clamped together, not laminated; a fourth material was a combination of the VALERON® brand film and the corrugated material board fully laminated; a fifth material was a combination of the VALERON® brand film and the corrugated material laminated with large, approximately 18 millimeter (mm) diameter adhesive spots with approximately 11 percent coverage of the facing surfaces; and a sixth material was VALERON® brand film and the corrugated material laminated with small approximately 10 mm diameter adhesive spots with approximately 25 percent coverage of the facing surfaces. The samples were tested to determine the average impact resistance in the material. The results are provided in TABLE 1, below.

TABLE 1

IMPACT TESTING OF VARIOUS FILM/BOARD MATERIAL COMBINATIONS

| Sample | Avg. Impact (kg-cm) | Stand Deviation |
|---|---|---|
| 3.0 mil VALERON ® (VA030030) | 128 | 9 |
| 200# "C" Flute Corrugated | 64 | 4 |
| VALERON ®/200# Board - clamped | 200 | 15 |

TABLE 1-continued

IMPACT TESTING OF VARIOUS FILM/BOARD MATERIAL COMBINATIONS

| Sample | Avg. Impact (kg-cm) | Stand Deviation |
|---|---|---|
| together, not laminated | | |
| VALERON ®/200# Board - fully laminated | 150 | 25 |
| VALERON ®/200# Board - large spot laminated | 192 | 16 |
| VALERON ®/200# Board - small spot laminated | 162 | 28 |

As can be seen from the results of TABLE 1, surprisingly, the clamped VALERON® film corrugated material exhibited the highest average impact resistance whereas the fully laminated material exhibited the lowest impact resistance. Similarly and again unexpectedly, the small spot lamination sample exhibited a lower average impact resistance than the large spot lamination sample. It has thus been found that minimal adhesion between the layers maximizes impact, burst and tear (resistance) properties of the composite materials. And, it will be understood that from a practical perspective, the materials 12, 14 must be adhered to one another, to some extent, so that they function and perform as a unitary sheet material.

Without being held to theory, it is believed that a continuous contact, high bond lamination creates a situation where the cross laminated film takes on the tear and impact properties of the material to which it is adhered. This is manifest where the modulus of elasticity of the two materials differ greatly. In such a case, if the two materials are able to move one relative to the other (e.g., less adhesion between the materials) the overall impact and or tear (resistance) properties will be enhanced. As shown by the results in TABLE 1, this can be achieved by "spot" bonding the materials or adhering the materials in some manner so as to form a discontinuous or non-continuous laminate, that is regions with different bond strengths between the material layers, (e.g., high-low (moderate) strength regions, bonded-nonbonded regions).

As seen in the figures, the layers 18, 20 are "cross-oriented" in that the orientation 22, 24 of the layers are at an angle α to one another. It will be recognized by those skilled in the art that the corrugated material 12 is formed from a pair of liner sheets 26 that sandwich a fluted material 28. As such, the flutes 28 also define a direction, indicated generally at 30. Typically, a corrugated material has a greater tear resistance across the flutes than along the flutes. It is anticipated that a bisector 32 of the orientation lines 22, 24 (which is ½ of the an angle α) can be at an angle β relative to the flute direction 30. The angle β can be from zero degrees to about 45 degrees.

It will be appreciated that the present laminate 10 can be used to, for example, fabricate boxes and other packaging containers. It is anticipated that the material 10 can be used with the film 14 disposed on the inner surface of the container to preclude tearing the material from the inside out. Alternately, the material 10 can be oriented with the film 14 disposed on the outer surface of the container. In either construction, it is anticipate that the present material 10 will provide a light-weight, rigid and structurally sound corrugated packaging material having an increased burst strength. This increased strength is achieved without significantly increasing the thickness or gauge of the corrugated material liner sheets. In addition, the lamination of the film material 14 to the corrugated layer 12 will also enhance the ability of the corrugated material to withstand increased environmental humidity conditions (when the film is disposed on the outside of the container) and accordingly internal humidity conditions (when the film is disposed on the inside of the container).

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A high strength film/board lamination comprising:
   a flat cross-oriented laminated film; and
   a corrugated layer, the corrugated layer comprised of a corrugated material positioned between two liner sheets,
   wherein the flat cross-oriented laminated film is formed from a first oriented plastic layer and a second oriented plastic layer wherein the orientations of the plastic layers cross at an angle between, but not equal to, zero degrees and 180 degrees relative to one another, and wherein the flat cross-oriented laminated film is adhered to at least one of the two liner sheets of the corrugated layer in a non-continuous manner.

2. The high strength lamination in accordance with claim 1 wherein the first plastic layer is oriented at an angle of about ninety degrees to the second plastic layer.

3. The high strength lamination in accordance with claim 1 wherein the plastic layers are formed from polyolefin materials.

4. The high strength lamination in accordance with claim 3 wherein the polyolefin is polyethylene.

5. The high strength lamination in accordance with claim 1 wherein the cross-oriented laminated film is spot adhered to the corrugated layer.

6. The high strength lamination in accordance with claim 5 wherein the spots are about 15 mm to 20 mm in diameter and extend over about 8 percent to 12 percent of a facing cross-oriented laminated film and a corrugated layer surface.

7. The high strength lamination in accordance with claim 1 wherein the cross-oriented laminated film is adhered to the corrugated layer with a pressure sensitive, hot melt, or extruded adhesive.

8. The high strength lamination in accordance with claim 1 including an abhesive disposed at predetermined locations between the cross-oriented laminated film and the corrugated layer to form non-bonded regions of the cross-oriented laminated film and corrugated layer.

9. The high strength lamination in accordance with claim 1 wherein the first plastic layer is oriented in a first direction and the second plastic layer is oriented in a second direction and wherein the first and second directions are at an angle between and excluding zero degrees and 180 degrees and wherein the corrugated layer includes flutes extending in a third direction and wherein the third direction is at an angle between and excluding zero degrees and 180 degrees relative to the first and second directions.

10. A method of forming a high strength lamination comprising the steps of:
    providing a corrugated layer, the corrugated layer including a corrugated material positioned between two liner sheets; and
    adhering a cross-oriented laminated film to at least one of the two liner sheets of the corrugated layer, the cross-oriented laminated film and the corrugated layer being adhered to one another in a noncontinuous manner.

11. The method of forming a high strength lamination in accordance with claim 10 wherein the cross-oriented laminated film and corrugated layer are spot adhered to one another.

12. The method of forming a high strength lamination in accordance with claim 10 wherein the cross-oriented laminated film and the corrugated layer are adhered to one another by a pressure sensitive, hot melt, or extruded adhesive.

13. The method of forming a high strength lamination in accordance with claim 10 wherein the corrugated layer includes flutes extending in a direction and wherein flute direction is at an angle between and excluding zero degrees and 180 degrees relative to the cross-oriented laminated film.

14. A method of improving tear resistance in corrugated paper or paperboard based material comprising the steps of:
    providing a cross-laminated film; and
    adhering the cross-laminated film to a corrugated layer, the corrugated layer including a corrugated material positioned between two liner sheets, the cross-oriented laminated film and the corrugated layer being adhered to one another in a noncontinuous manner.

15. The method of improving tear resistance in accordance with claim 14 wherein the cross-oriented laminated film and corrugated layer are spot adhered to one another.

16. The method of improving tear resistance in accordance with claim 14 wherein the cross-oriented laminated film and the corrugated layer are adhered to one another by a pressure sensitive, hot melt, or extruded adhesive.

17. The method of improving tear resistance in accordance with claim 14 wherein the corrugated layer includes flutes extending in a direction and wherein flute direction is at an angle between and excluding zero degrees and 180 degrees relative to the cross-oriented laminated film.

* * * * *